United States Patent
Kovacevich et al.

(10) Patent No.: US 7,249,727 B2
(45) Date of Patent: Jul. 31, 2007

(54) INDEPENDENTLY DRAWING AND TENSIONING LINES WITH BI-DIRECTIONAL ROTARY DEVICE HAVING TWO SPOOLS

(75) Inventors: Ian D. Kovacevich, Charlotte, NC (US); Kevin J. Dahlquist, Charlotte, NC (US); Tom Philpott, Charlotte, NC (US); Daniel Lee Bizzell, Davidson, NC (US)

(73) Assignee: Enventys, LLC, Charlotte, NC (US)

( * ) Notice: Subject to any disclaimer, the term of this patent is extended or adjusted under 35 U.S.C. 154(b) by 0 days.

(21) Appl. No.: 11/382,708

(22) Filed: May 11, 2006

(65) Prior Publication Data

US 2006/0202077 A1 Sep. 14, 2006

Related U.S. Application Data

(63) Continuation of application No. 11/276,357, filed on Feb. 24, 2006, and a continuation-in-part of application No. 11/222,549, filed on Sep. 9, 2005, now abandoned, which is a continuation-in-part of application No. 11/123,942, filed on May 6, 2005, said application No. 11/222,549 is a continuation-in-part of application No. 11/123,900, filed on May 6, 2005.

(60) Provisional application No. 60/656,335, filed on Feb. 25, 2005, provisional application No. 60/608,397, filed on Sep. 9, 2004, provisional application No. 60/569,304, filed on May 7, 2004.

(51) Int. Cl.
*B65H 75/30* (2006.01)

(52) U.S. Cl. ............... 242/394; 242/388.1; 242/388.2; 242/388.3; 242/388.6; 242/388.7; 242/388.8

(58) Field of Classification Search .............. 242/394, 242/388.1–388.3, 378.1–378.4, 388.6–388.8, 242/350, 356, 356.5, 356.7, 390, 390.8, 393, 242/395, 395.1; 254/214, 215, 218; 192/223.1, 192/43
See application file for complete search history.

(56) References Cited

U.S. PATENT DOCUMENTS 176,926 A 5/1876 Burk (Continued)

FOREIGN PATENT DOCUMENTS

JP 6171836 6/1994

(Continued)

*Primary Examiner*—Gene O. Crawford
*Assistant Examiner*—Sang Kim
(74) *Attorney, Agent, or Firm*—Tillman Wright, PLLC; Chad D. Tillman; James D. Wright

(57) ABSTRACT

A method of drawing lines into a housing includes: rotating a dial in a first rotational direction of the dial such that a first spool located in an interior of the housing is mechanically rotated in a first rotational direction thereby winding a first line thereabout; and rotating the same dial in a second rotational direction opposite to the first rotational direction such that a second spool located in the interior of the housing is mechanically rotated in a first rotational direction thereby winding a second line thereabout. The rotating of the same dial in the second, opposite rotational direction does not result in unwinding of the first line from the first spool, and the rotating of the same dial in the first rotational direction does not result in unwinding of the second line from the second spool.

22 Claims, 13 Drawing Sheets

U.S. PATENT DOCUMENTS

| | | |
|---|---|---|
| 757,893 A | 4/1904 | Daughters |
| 813,574 A | 2/1906 | McNames |
| 881,772 A | 3/1908 | Canney |
| 2,536,875 A | 1/1951 | Dalrymple |
| 2,601,409 A | 6/1952 | McArthur et al. |
| 2,611,284 A | 9/1952 | Albee |
| 2,991,523 A | 7/1961 | Del Conte |
| 3,206,855 A | 9/1965 | Fletcher |
| 3,208,121 A | 9/1965 | Price |
| 3,973,275 A | 8/1976 | Blauer |
| 5,042,177 A | 8/1991 | Schoch |
| 5,060,314 A | 10/1991 | Lewis |
| 5,073,985 A | 12/1991 | Stone et al. |
| 5,331,683 A | 7/1994 | Stone et al. |
| 5,373,582 A | 12/1994 | Dragone et al. |
| 5,398,340 A | 3/1995 | Kibbee |
| 5,471,906 A | 12/1995 | Bachner, Jr. et al. |
| 5,479,659 A | 1/1996 | Bachner, Jr. |
| 5,495,621 A | 3/1996 | Kibbee |
| 5,507,471 A | 4/1996 | Mercurio |
| 5,797,140 A | 8/1998 | Davis et al. |
| 5,799,329 A | 9/1998 | Hauschild |
| 5,926,842 A | 7/1999 | Price et al. |
| 5,970,513 A | 10/1999 | Kocher |
| 5,974,585 A | 11/1999 | Bachner, Jr. |
| 6,029,270 A | 2/2000 | Ost et al. |
| 6,047,399 A | 4/2000 | Bachner, Jr. |
| 6,151,710 A | 11/2000 | Bachner, Jr. |
| 6,182,288 B1 | 2/2001 | Kibbee |
| 6,185,738 B1 | 2/2001 | Sidebottom |
| 6,449,769 B1 | 9/2002 | Bachner, Jr. |
| 6,507,486 B2 | 1/2003 | Peterson, III |
| 6,526,862 B1 | 3/2003 | Lyons |
| 6,543,055 B2 | 4/2003 | Howland et al. |
| 6,651,543 B2 | 11/2003 | Park |
| 6,698,024 B2 | 3/2004 | Graves et al. |
| 2002/0145849 A1 | 10/2002 | Peterson, III |
| 2003/0066116 A1 | 4/2003 | Graves et al. |
| 2005/0177920 A1 | 8/2005 | Wilkinson |
| 2005/0247813 A1 | 11/2005 | Kovacevich et al. |
| 2006/0015988 A1 | 1/2006 | Philpott et al. |

FOREIGN PATENT DOCUMENTS

| | | |
|---|---|---|
| JP | 2000-320999 | 11/2000 |

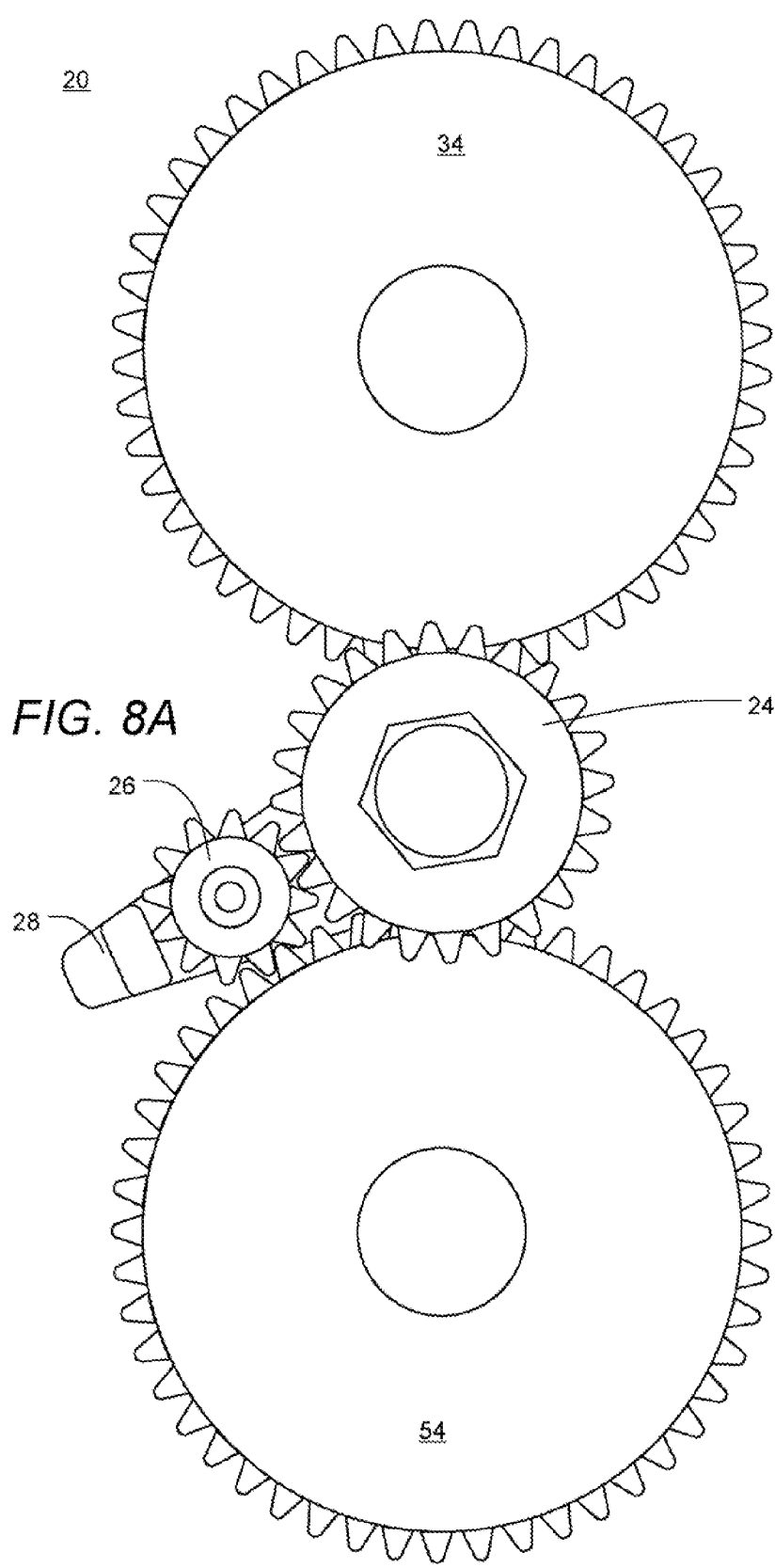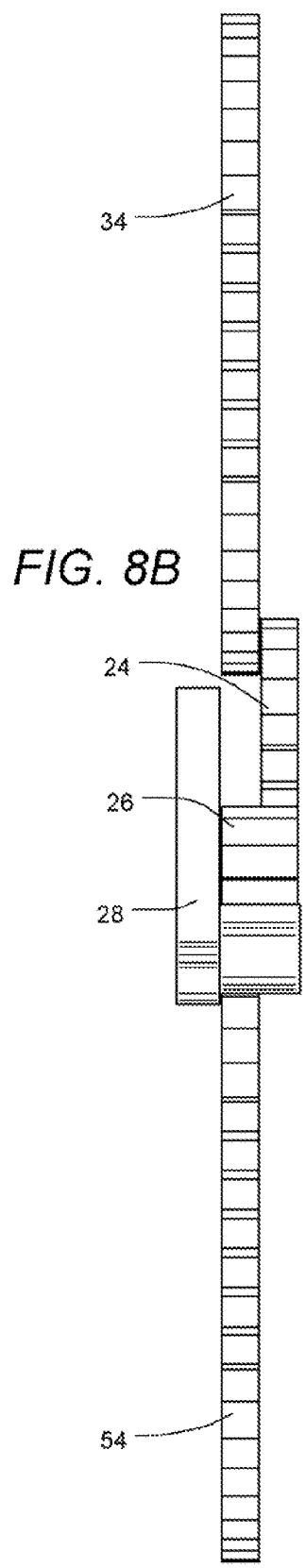

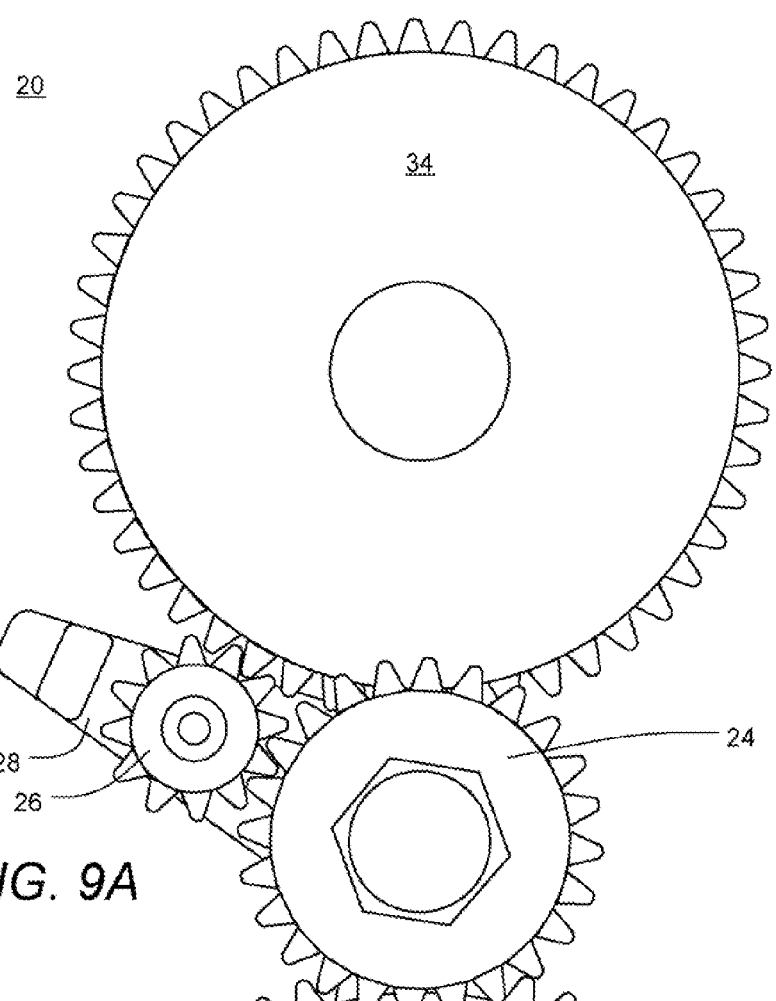
FIG. 9A
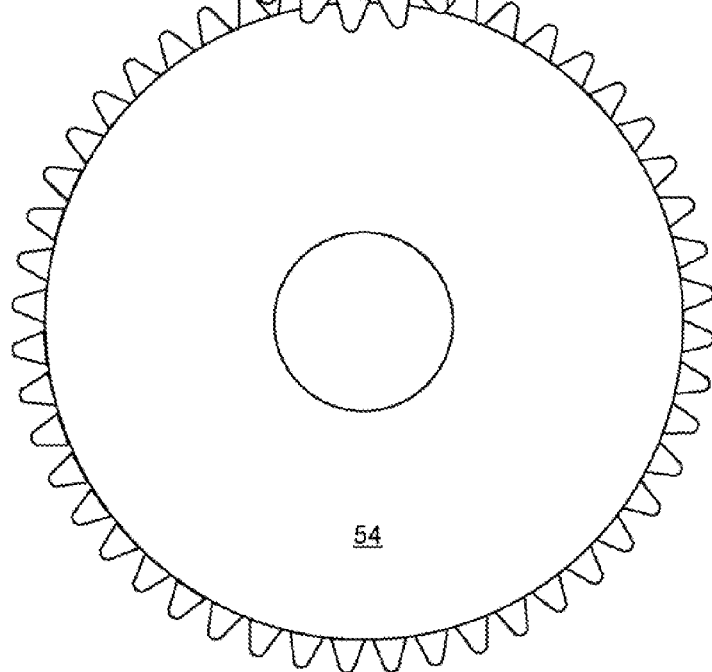
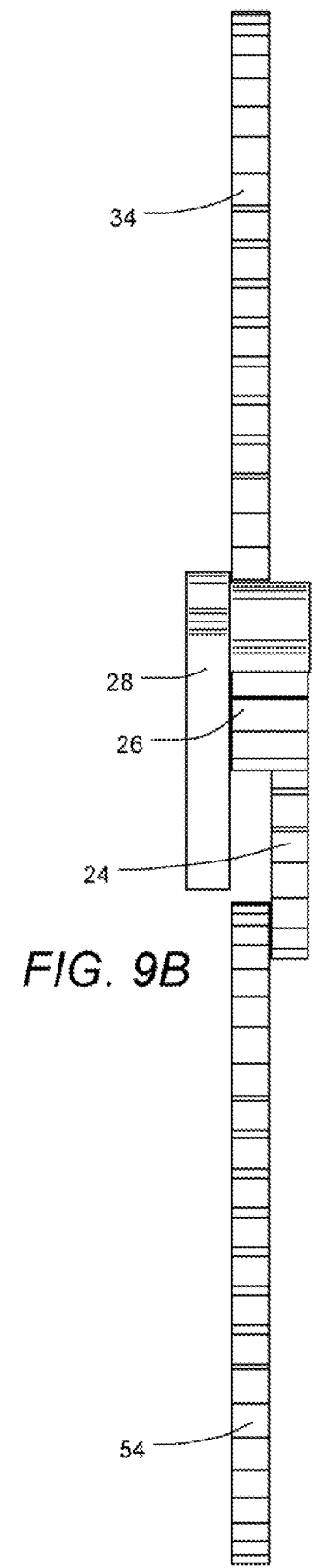
FIG. 9B

Clockwise rotation of disk retracts first set of one or more lines

Pressing of first pad releases first set

Counter-clockwise rotation of disk retracts second set of one or more lines

Pressing of second pad releases second set

Simultaneous pressing of first and second pads simultaneously releases first and second sets

INDEPENDENTLY DRAWING AND TENSIONING LINES WITH BI-DIRECTIONAL ROTARY DEVICE HAVING TWO SPOOLS

CROSS-REFERENCE TO RELATED APPLICATIONS

This application is a continuation of, and claims priority under 35 U.S.C. § 120 to, U.S. patent application Ser. No. 11/276,357, filed Feb. 24, 2006, which is a nonprovisional of, and claims priority under 35 U.S.C. § 119(e) to, U.S. Provisional Patent Application No. 60/656,335, filed Feb. 25, 2005, and which is a continuation-in-part of U.S. patent application Ser. No. 11/222,549, filed Sep. 9, 2005 now abandoned, which is a continuation-in-part of: U.S. patent application Ser. No. 11/123,942, filed May 6, 2005, which published as U.S. Patent Application Publication No. US 2006/0015988 A1, and which is a nonprovisional of Ser. Nos. 60/569,304, 60/608,397, and 60/656,335; and U.S. patent application Ser. No. 11/123,900 filed May 6, 2005, which published as U.S. Patent Application Publication No. US 2005/0247813 A1, and which is a nonprovisional of Ser. Nos. 60/569,304, 60/608,397, and 60/656,335. The entire disclosure of each of these patent applications and patent application publications is hereby incorporated herein by reference.

COPYRIGHT STATEMENT

All of the material in this patent document, including that of the figures, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

SUMMARY OF THE INVENTION

The present invention includes many aspects and features. Moreover, while many aspects and features relate to methods and apparatus for tensioning lines, and may be described in the context of adjustably fitted articles of protective apparel, such as ballistic vests, the present invention is not limited to use only in protective apparel, as will become apparent from the following summaries and detailed descriptions of aspects, features, and one or more embodiments of the invention.

In an aspect of the invention, a method of drawing lines into a housing includes the steps of: rotating a dial in a first rotational direction of the dial such that a first spool located in an interior of the housing is mechanically rotated in a first rotational direction thereby winding a first line thereabout; and rotating the dial in a second rotational direction of the dial opposite to the first rotational direction of the dial such that a second spool located in the interior of the housing is mechanically rotated in a first rotational direction thereby winding a second line thereabout.

In a feature of this aspect, the method further includes the steps of: during rotation of the dial in the second rotational direction of the dial, inhibiting the first spool from rotating in the second rotational direction of the first spool, thereby keeping the first line from unwinding from the first spool; and during rotation of the dial in the first rotational direction of the dial, inhibiting the second spool from rotating in the second rotational direction of the second spool, thereby keeping the second line from unwinding from the second spool. Furthermore, the method further preferably includes the steps of: disengaging a first pawl inhibiting the first spool from rotating in the second rotational direction of the first spool, whereby the first line may be unwound from the first spool and withdrawn from the housing; and disengaging a second pawl inhibiting the second spool from rotating in the second rotational direction of the second spool, whereby the second line may be unwound from the second spool and withdrawn from the housing. The first pawl may be disengaged independently of the second pawl and the second pawl may be disengaged independently of the first pawl. Alternatively, the first pawl may be first disengaged and then the second pawl may be disengaged, or the first pawl and the second pawl may be simultaneously disengaged.

In another feature of the invention, each line is anchored at a point exterior to the housing whereby each line is tensioned as each line is drawn into the housing, each line being independently tensioned in accordance with the method.

In another aspect of the invention, a method of tensioning lines includes the steps of: rotating a dial in a first rotational direction of the dial such that a first spool located in an interior of the housing is mechanically rotated by the dial in a first rotational direction thereby winding a first and second lines thereabout; and rotating the dial in a second rotational direction of the dial opposite to the first rotational direction of the dial such that a second spool located in the interior of the housing is mechanically rotated by the dial in a first rotational direction thereby winding a third and fourth line thereabout. The first and second lines may be tensioned together, the third and fourth lines may be tensioned together, and the first and second lines may be independently tensioned with respect to the third and fourth lines. With further respect to this aspect, the first and second lines also may form an endless loop and the third and fourth lines may form an endless loop. In particular, the first and second lines may be connected by a line segment extending through the first spool, and the third and fourth lines may be connected by a line segment extending through the second spool.

The method also may further include the steps of: during rotation of the dial in the second rotational direction of the dial, inhibiting the first spool from rotating in the second rotational direction of the first spool, thereby keeping the first and second lines from unwinding from the first spool; and during rotation of the dial in the first rotational direction of the dial, inhibiting the second spool from rotating in the second rotational direction of the second spool, thereby keeping the third and fourth lines from unwinding from the second spool.

Moreover, the method also may include the steps of: disengaging a first pawl inhibiting the first spool from rotating in the second rotational direction of the first spool, whereby the first and second lines may be unwound from the first spool and withdrawn from the housing; and disengaging a second pawl inhibiting the second spool from rotating in the second rotational direction of the second spool, whereby the third and fourth lines may be unwound from the second spool and withdrawn from the housing. The first pawl may be disengaged independently of the second pawl and wherein the second pawl is disengaged independently of the first pawl; the first pawl may be first disengaged then followed by disengagement of the second pawl; or the first pawl and the second pawl may be simultaneously disengaged.

In another aspect of the invention, a method includes: a step for winding a first line about a first spool located within a housing by rotating a dial in a first rotational direction, whereby the first line is drawn into the housing while inhibiting unwinding of a second line from a second spool also located within the housing; and a step for winding the second line about the second spool by rotating the dial in a second rotational direction opposite the first rotational direction, whereby the second line is drawn into the housing while inhibiting unwinding of the first line from the first spool. The method may further include: a step for unwinding the first line from the first spool; and a step for unwinding the second line from the second spool independent of the unwinding of the first line from the first spool.

In another aspect of the invention, a device for winding lines within a housing includes: means for winding a first line about a first spool located within a housing by rotating a dial in a first rotational direction, whereby the first line is drawn into the housing while inhibiting unwinding of a second line from a second spool also located within the housing; and means for winding the second line about the second spool by rotating the dial in a second rotational direction opposite the first rotational direction, whereby the second line is drawn into the housing while inhibiting unwinding of the first line from the first spool. The device also may include: means for unwinding the first line from the first spool; and means for unwinding the second line from the second spool independent of the unwinding of the first line from the first spool.

In still yet another aspect of the invention, a device for independently tensioning lines includes: a dial including a drive shaft that extends from the dial, the dial and drive shaft rotatable about a drive axis; a drive gear fixed on drive shaft for rotation with the drive shaft about the drive axis during rotation of the dial; a pinion mounted on a pivot arm and rotatable relative to the pivot arm about a pinion axis, wherein teeth of the pinion are engaged with teeth of the drive gear, and wherein the pivot arm is mounted on the drive shaft and rotatable relative to the drive shaft about the drive axis to different positions including a first position, in which teeth of the pinion engage teeth of a first gear but not teeth of a second gear, a second position, in which teeth of the pinion engage teeth of the second gear but do not engage teeth of the first gear, and an intermediate position, in which teeth of the pinion do not engage teeth of either the first gear or teeth of the second gear; a first spool fixed on a first spindle for rotation with the first spindle about a first spindle axis, the first spindle being coaxial with, and fixedly connected to, the first gear for rotation therewith about the first spindle axis, the fist spool including a first ratchet wheel coaxial with the first gear; a second spool fixed on a second spindle for rotation with the second spindle about a second spindle axis, the second spindle being coaxial with, and fixedly connected to, the second gear for rotation therewith about the second spindle axis, the second spool including a second ratchet wheel coaxial with the second gear; a first pawl configured to engage ratchet teeth of the first ratchet wheel thereby preventing rotation of the first spool in a first rotational direction of the first spool, but permitting rotation of the first spool in a second rotational direction of the first spool; a second pawl configured to engage ratchet teeth of the second ratchet wheel thereby preventing rotation of the second spool in a first rotational direction of the second spool, but permitting rotation of the second spool in a second rotational direction of the second spool; a first release member configured to selectively displace the first pawl from engagement with the ratchet teeth of the first spool, thereby permitting rotation of the first spool in the first rotational direction of the first spool; and a second release member configured to selectively displace the second pawl from engagement with the ratchet teeth of the second spool, thereby permitting rotation of the second spool in the first rotational direction of the second spool.

In accordance with this aspect, rotation of the dial in a first rotational direction about the drive axis results in rotation of the first spool in the second rotational direction of the first spool, but does not result in rotation of the second spool, and rotation of the dial in a second rotational direction about the drive axis results in rotation of the second spool in the second rotational direction of the second spool, but does not result in rotation of the first spool.

In a feature of this aspect, a first line is wound about the first spool when the first spool is rotated in the second rotational direction of the first spool, whereby tension may be applied to the first line, and a second line is wound about the second spool when the second spool is rotated in the second rotational direction of the second spool, whereby tension may be applied to the second line independent of tension that is applied to the first line. The first spool may include an radial opening through which a first line extends and the second spool may include a radial opening through which a second line extends. Furthermore, the first spool may include a pair of opposed radial openings through both of which a first line extends and the second spool may include a pair of opposed radial openings through both of which a second line extends.

In another feature, the first release member is additionally configured to selectively displace the pivot arm from the first position when the first release member is selectively displacing the first pawl from engagement with the ratchet teeth of the first spool, and the second release member is additionally configured to selectively displace the pivot arm from the second position when the second release member is selectively displacing the second pawl from engagement with the ratchet teeth of the second spool.

In still yet another feature, the first release member is movable between a position in which the first pawl is displaced from engagement with the ratchet teeth of the first spool and a second position in which the first pawl is not displaced from engagement with the ratchet teeth of the first spool, and wherein the first release member is biased by a first elastic component toward the second position; and the second release member is movable between a position in which the second pawl is displaced from engagement with the ratchet teeth of the second spool and a second position in which the second pawl is not displaced from engagement with the ratchet teeth of the second spool, and wherein the second release member is biased by a second elastic component toward the second position. The first elastic component may be integrally formed with the first release member, and the second elastic component may be integrally formed with the second release member.

In another feature, the device further may include a housing in which the drive shaft, the drive gear, the pinion, the pivot arm, the first gear, the second gear, the first spool, the first spindle, the first ratchet wheel, the second spool, the second spindle, the second ratchet wheel, the first pawl, and the second pawl are located. The first release member and the second release member also may extend partially within the housing and partially outside of the housing, and the first and second elastic components may engage an exterior of the housing and respectively urge the first and second release members further out of the housing.

The housing also may include a length and a width that are substantially greater than a height such that the housing is relatively thin, thereby giving the housing a planar appearance. The housing also may include a bottom surface that is substantially planar. The housing also may include a top casing and a bottom casing that are coupled together. The dial in such instance may be located exterior to the top casing, and the drive shaft may extend from the dial through coaxial openings of the top casing and the bottom casing and include and end thereof that snaps into locking engagement to the bottom casing within the coaxial opening of the bottom casing. The first and second pawls also may be integrally formed with the bottom casing; and the bottom casing may define cableways providing protected passageways to the first and second spools for the unobstructed tensioning of lines by the first and second spools.

The bottom casing also may define two pair of cableways, each respective cableways of a pair having coaxial passageways.

In a feature, the top casing defines a guide slot and wherein the pivot arm includes a extension that is received within the guide slot during movement of the pivot arm between the first, second, and intermediate positions.

In still yet other features of the invention, the first spindle and the first gear and integrally formed, and the second spindle and the second gear are integrally formed; the dial and the drive shaft are integrally formed; the first pool and the first ratchet wheel are integrally formed, and the second spool and the second ratchet wheel are integrally formed; the device consists of only injection molded pieces; and/or the device does not include any metallic components.

In another aspect of the invention, a device for independently tensioning lines includes: a dial; a drive gear that is fixedly connected to the dial, the dial and drive gear being concentric and rotatable together about a drive axis; a pinion rotatable about a pinion axis and having teeth engaged with teeth of the drive gear, the pinion being pivotable about the drive axis to different positions including, a first position, in which teeth of the pinion engage teeth of a first gear but not teeth of a second gear, a second position, in which teeth of the pinion engage teeth of the second gear but do not engage teeth of the first gear, and an intermediate position, in which teeth of the pinion do not engage teeth of either the first gear or teeth of the second gear; a first spool fixed on a first spindle for rotation with the first spindle about a first spindle axis, the first spindle being coaxial with, and fixedly connected to, the first gear for rotation therewith about the first spindle axis; a second spool fixed on a second spindle for rotation with the second spindle about a second spindle axis, the second spindle being coaxial with, and fixedly connected to, the second gear for rotation therewith about the second spindle axis; a first pawl configured to engage, and thereby prevent rotation of, the first spool in a first rotational direction of the first spool, while permitting rotation of the first spool in a second rotational direction of the first spool; a second pawl configured to engage, and thereby prevent rotation of, the second spool in a first rotational direction of the second spool, while permitting rotation of the second spool in a second rotational direction of the second spool; a first release member configured to selectively displace the first pawl from engagement with the first spool, thereby permitting rotation of the first spool in the first rotational direction of the first spool; and a second release member configured to selectively displace the second pawl from engagement with the second spool, thereby permitting rotation of the second spool in the first rotational direction of the second spool.

In accordance with this aspect, rotation of the dial in a first rotational direction about the drive axis results in rotation of the first spool in the second rotational direction of the first spool, but does not result in rotation of the second spool, and rotation of the dial in a second rotational direction about the drive axis results in rotation of the second spool in the second rotational direction of the second spool, but does not result in rotation of the first spool.

In a feature of this aspect, the first release member and the second release member respectively comprise opposite ends of a center-pivoted lever that is pivotal between a first position, in which the first release member engages and displaces the first pawl, a second position, in which the second release member engages and displaces the second pawl, and an intermediate position in which the lever arm displaces neither the first pawl nor the second pawl.

In another feature, the device further includes a first line that is wound about the first spool when the first spool is rotated in the second rotational direction of the first spool, whereby tension may be applied to the first line, and a second line that is wound about the second spool when the second spool is rotated in the second rotational direction of the second spool, whereby tension may be applied to the second line independent of tension that is applied to the first line. The first spool may include an radial opening through which a first line extends and the second spool may include a radial opening through which a second line extends; and the first spool may include a pair of opposed radial openings through both of which a first line extends and the second spool may include a pair of opposed radial openings through both of which a second line extends.

Additionally, the first release member may be movable between a position in which the first pawl is displaced from engagement with the first spool and a second position in which the first pawl is not displaced from engagement with the first spool, wherein the first release member is biased by an elastic component toward the second position; and the second release member may be movable between a position in which the second pawl is displaced from engagement with the second spool and a second position in which the second pawl is not displaced from engagement with the second spool, wherein the second release member is biased by an elastic component toward the second position. Moreover, the same elastic member, such as a spring, may bias both the first release member toward the second position and the second release member toward the second position.

In another feature, the device further includes a housing in which the drive gear, the pinion, the first gear, the second gear, the first spool, the first spindle, the second spool, the second spindle, the first pawl, and the second pawl are located. The housing may include a length and a width that are substantially greater than a height such that the housing is relatively thin and include a generally planar appearance. Furthermore, the housing may includes=a bottom surface that is substantially planar for mounting of the device to a generally planar surface.

In another feature of this aspect, the housing includes a top casing and a bottom casing that are coupled together. The bottom casing may define cableways providing protected passageways to the first and second spools for the unobstructed tensioning of lines by the first and second spools, and the bottom casing may define two pair of cableways.

The top casing may define a guide slot and an extension fixedly connected to the pinion may be received within the guide slot during movement of the pinion between the first, second, and intermediate positions, whereby the pinion may be guided and supported in its movement.

In another feature, both the first pawl and the second pawl are pivotably disposed within the housing.

In still yet another aspect of the invention, a device for independently tensioning lines includes: a housing; a control handle extending from the housing; a first line extending from the housing; and a second line extending from the housing. The control handle is rotatable about an axis in a first rotational direction, whereby at least a portion of said first line is drawn into said housing when said control handle is rotated in the first rotational direction. The control handle also is rotatable about said axis in a second rotational direction, whereby at least a portion of said second line is drawn into said housing when said control handle is rotated in the second rotational direction, wherein the second rotational direction is opposite to the first rotational direction. The control handle preferably comprises a dial.

In another aspect of the invention, a device for independently drawing lines into a housing includes: means for drawing at least a portion of a first line into the housing when a control handle is rotated in a first rotational direction; means for drawing at least a portion of a second line into the housing when the control handle is rotated in a second rotational direction opposite the first rotational direction; and means for retaining the portion of the first line within the housing when a portion of the second line is drawn into the housing and for retaining a portion of the second line within the housing when a portion of the first line is drawn into the housing.

In a feature of this invention, the device further includes means for releasing a portion of the first line from the housing without also releasing a portion of the second line from the housing. The device further may include means for releasing a portion of the second line from the housing without also releasing a portion of the first line from the housing.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIG. 8A which is a front plan view of the pivot arm together with the various gears all shown in isolation from the rest of the components of the device, wherein the pivot arm is in a first engaged position;

FIG. 8B which is a side plan view of the pivot arm together with the various gears all shown in isolation from the rest of the components of the device, wherein the pivot arm is in a first engaged position;

FIG. 9A which is a front plan view of the pivot arm together with the various gears all shown in isolation from the rest of the components of the device, wherein the pivot arm is in a second engaged position;

FIG. 9B which is a side plan view of the pivot arm together with the various gears all shown in isolation from the rest of the components of the device, wherein the pivot arm is in a second engaged position;

DETAILED DESCRIPTION

Figure 1:
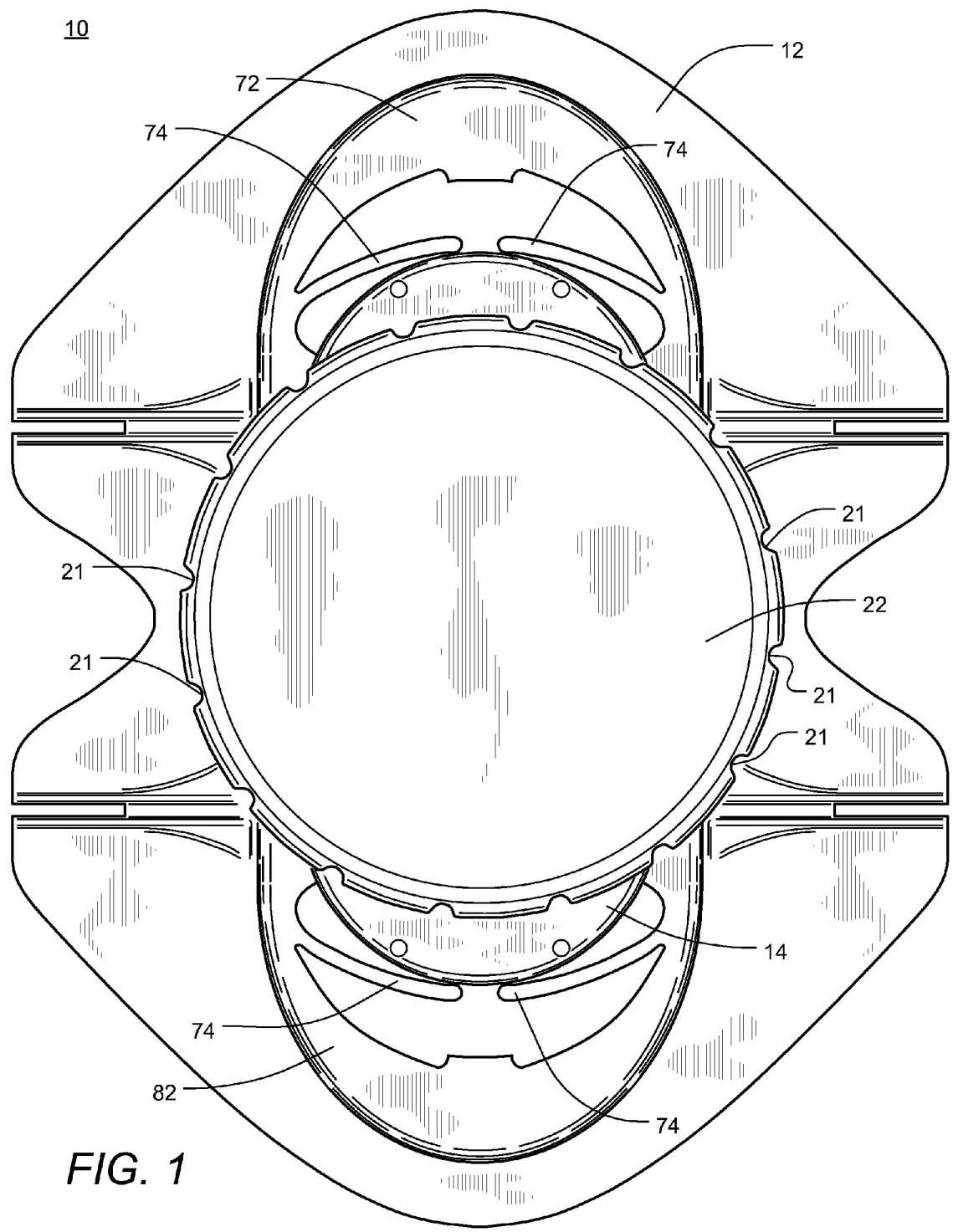
FIG. 1 is a front plan view of a device for independently tensioning lines in accordance with an embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Figure 2:
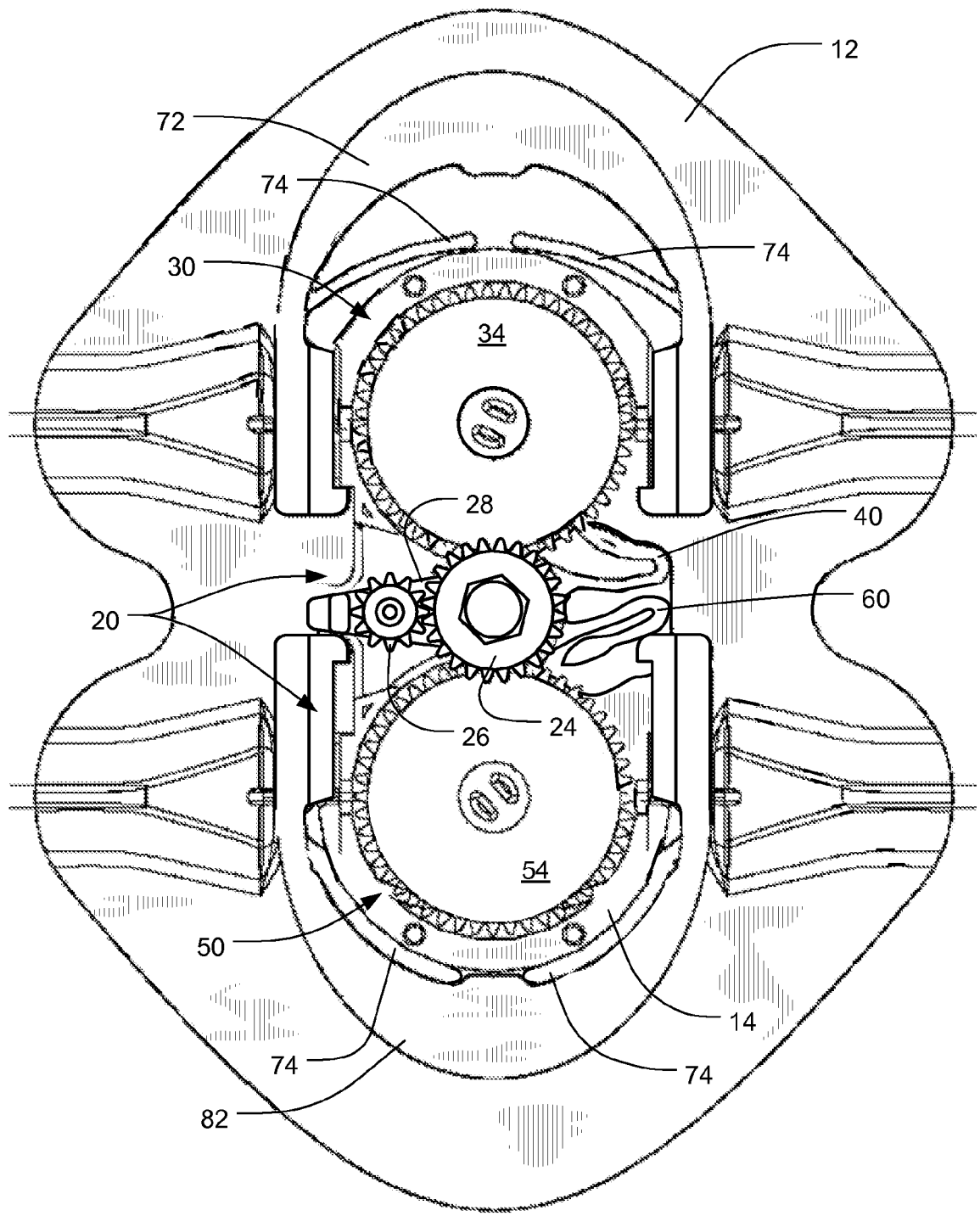
FIG. 2 is a front plan view of an interior of the device of FIG. 1
Figure 3:
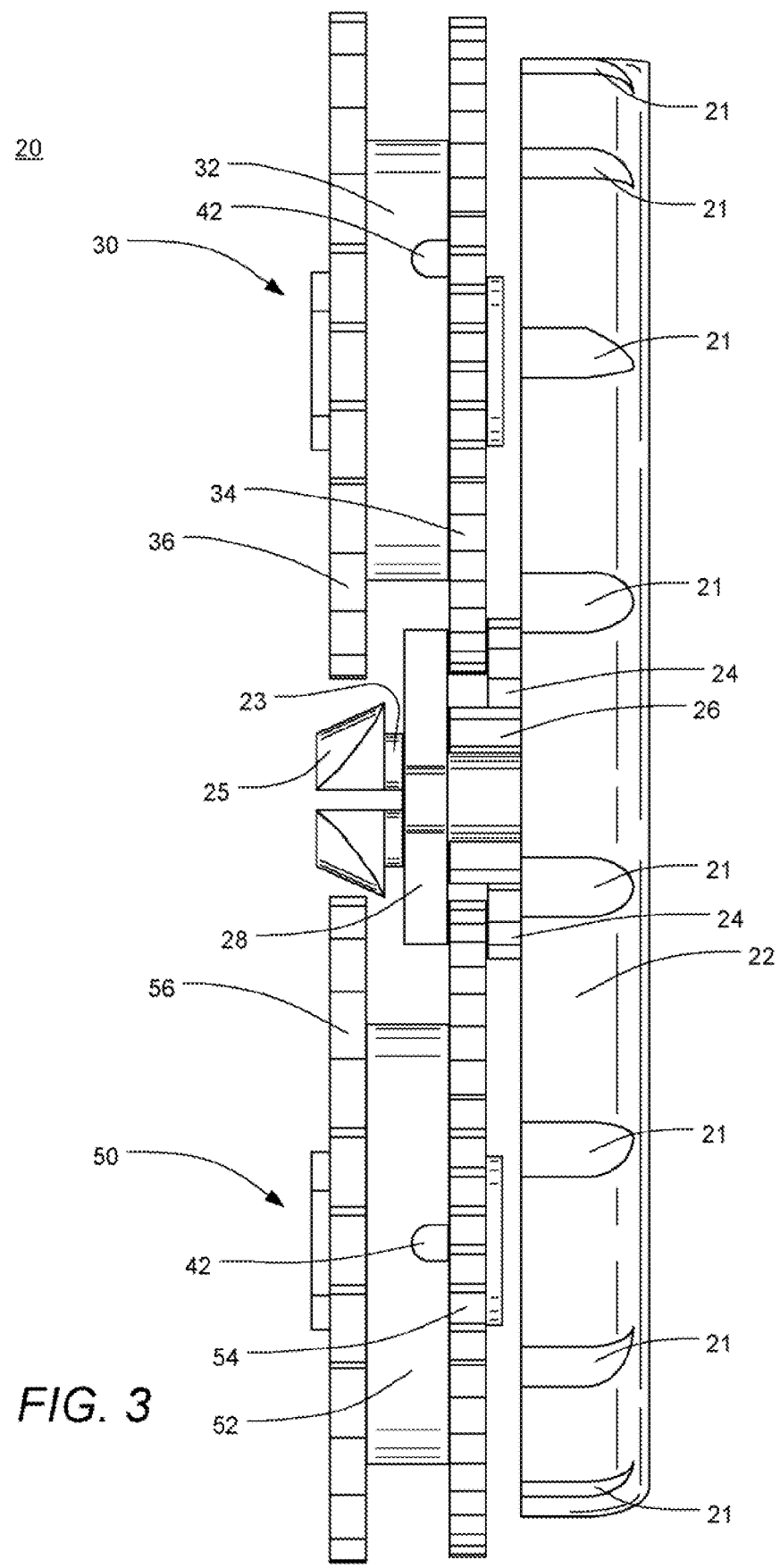
FIG. 3 is a side plan view of rotatable components of the device of FIG. 2.

FIG. 1 is a front plan view of a device 10 for independently tensioning lines in accordance with an embodiment of the present invention, while FIG. 2 is a front plan view of an interior of the device 10 of FIG. 1, and FIG. 3 is a side plan view of rotatable components of the device 10 of FIG. 2. As collectively shown therein, the device 10 includes a base 12 and a cover 14, mounted within which are a drive assembly 20, one or more spool assemblies 30,50, a ratcheting assembly including a pawl 40,60 for each respective spool assembly 30,50, and a release assembly including release member 72,82 for each respective spool assembly 30,50. Each of these components of the device 10 is described in detail hereinbelow.

The drive assembly 20 includes a dial 22, a drive gear 24 and a pinion 26 mounted on a pivot arm 28. The dial 22 includes a drive shaft 23 extending therefrom, and the dial 22 and drive shaft 23 are rotatable about a drive axis. The outer surface of the dial 22 may include indentations 21 or other features to make it possible for a user to grasp and turn it easily. The drive gear 24 is fixed on the drive shaft 23 for rotation with the drive shaft 23 about the drive axis. A proximal end of the pivot arm 28 is rotatably mounted on the drive shaft 23, while the pinion 26 is mounted on the distal end of the pivot arm 28 and is rotatable relative to the pivot arm 28 about a pinion axis. The teeth of the pinion 26 are arranged for a purpose made apparent hereinbelow.

The end of the drive shaft 23 is preferably bifurcated and provided with a wedge-shaped retention flange 25, wherein the wedge-shaped retention flange 25 may be forced into a corresponding opening in the pivot arm 28, thereby deflecting the two bifurcated portions of the shaft 23 inward, toward each other, thus permitting the wedge-shaped retention flange 25 to pass there through. Once the flange 25 has passed completely through the opening, the two bifurcated portions of the shaft 23 are biased outward again, thereby retaining the pivot arm 28 on the drive shaft 23.

Similarly, the cover 14 and the base 12, which collectively form a housing and are described in further detail below, include coaxial openings through which the end of the drive shaft 23 extends. Furthermore, because the dial 22 is located generally exterior to the cover 14, when the wedge-shaped retention flange 25 is forced through the openings in the cover 14 and the base 12, and is retained to the base 12 by the snap-fit connection of the retention flange 25 to the flanged opening of the base 12, the base 12 and cover 14 are securely coupled together and preferably retain all of the components therein without aid of additional fasteners, such as screws. Indeed, due to this design, the device 10 may be constructed without use of any metallic fasteners, and the device 10 may be constructed solely from injection molded components. Such a construction is particularly beneficial when the device 10 is utilized, for example, with ballistic vests or other body armor, where the use of a screw poses an unnecessary risk to a wearer.

Each spool assembly 30,50 includes a spindle (not shown) upon which a respective spool 32,52, gear 34,54 and ratchet wheel 36, 56 are all fixed. Two or more of the spindle, spool 32,52, gear 34,54 and ratchet wheel 36,56 of a respective spool assembly may be integrally formed, or all of the components may comprise separate pieces that are connected together. In any event, a respective spool assembly 30,50 includes a spindle, spool 32,52, gear 34,54 and ratchet wheel 36,56 that all rotate together about a respective spindle axis, with each spool 32,52 arranged between a respective gear 34,54 and ratchet wheel 36,56.

Furthermore, each gear 34,54 includes a plurality of gear teeth adapted to couple with the teeth of the pinion 26 when the pinion 26 is positioned next to the gear 34,54. The teeth of each ratchet wheel 36,56 are arranged to be engaged by a respective pawl 40,60, as will be more fully described hereinbelow. Each spool 32,52 further includes a pair of openings 42 to permit a cable to be routed there through and for winding on the spool 32,52 during rotation of the spool in a particular direction, as more fully described hereinbelow.

Figure 4:
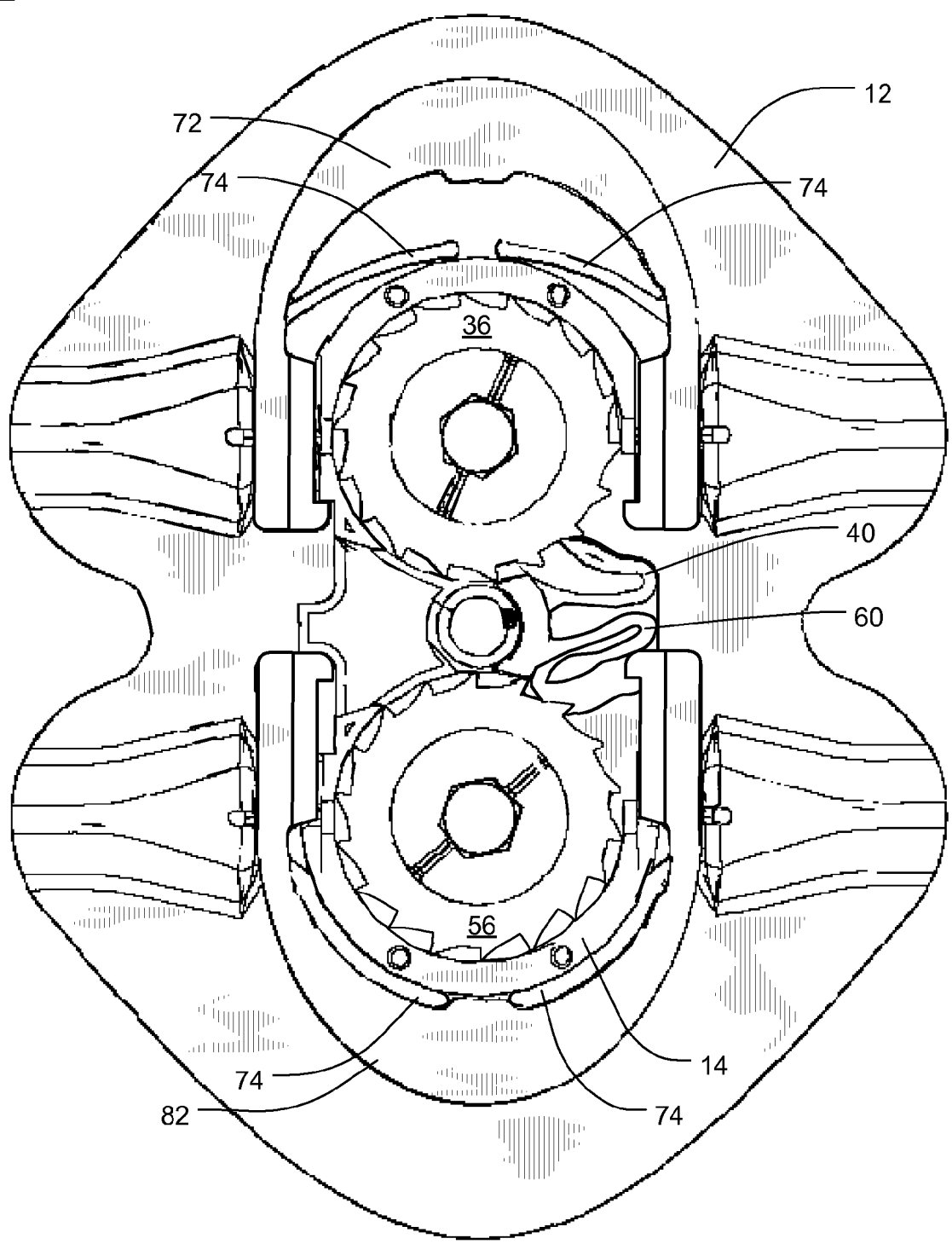
FIG. 4 is a front plan view of the interior of the device of FIG. 1, shown with most of the rotatable components removed therefrom.

FIG. 4 is a front plan view of the interior of the device 10 of FIG. 1, shown with most of the rotatable components removed therefrom. With particular reference to FIGS. 2 and 4, the pawls 40,60 are shown arranged in, and optionally contiguous to, the base 12. As will be appreciated, the pawls 40,60 furthermore extend upwardly (are raised) from the base for selective engagement by the release members 72,82 and for engagement with the ratchet wheels 36,56. Each pawl 40,60 further comprises a gooseneck structure extending from a central region of the base 12 and curving around so as to be adapted to engage the teeth of a respective ratchet wheel 36,56. When so engaged, each pawl 40,60 prevents its respective ratchet wheel 36,56 from rotating in a particular rotational direction, while permitting rotation in the opposite rotational direction, due to the engagement between the pawl 40,60 with the ratchet teeth.

With reference now to FIGS. 1, 2 and 4, a release member 72,82 is shown for each spool assembly 30,50. Each release member 72,82 comprises a horseshoe-shaped (or "U" shaped) member that is slidably contained between the base 12 and the cover 14. The release members 72,82 are preferably operable independently of each other.

The movement of each the release members 72,82 may be best understood as shown in FIG. 2 or FIG. 4. In each case, a first release member 72 is configured in its retracted position, wherein no contact is made between the open ends of the release member 72 and the adjacent pawl 40, while a second release member 82 is configured in its depressed position, wherein one of the open ends of the release member 82 has been placed in contact with its adjacent pawl 60, thereby displacing the gooseneck assembly of the pawl 60 from its normal position in engagement with ratchet teeth. As best seen in FIG. 4, this has the effect of displacing the second pawl 60 from its position against one of the teeth of the ratchet wheel 56, while the first pawl 40 remains in its previous state (i.e., in contact with one of the teeth of the ratchet wheel 36). As will be apparent, when a pawl 40,60 remains in contact with one of the teeth of its respective ratchet wheel 36,56, the ratchet wheel 36,56 is thereby prevented from rotating in a particular rotational direction, while if a pawl 40,60 is displaced from its position against one of the teeth of the ratchet wheel 36,56 by the corresponding release member 72,82, then the ratchet wheel 36,56 is allowed to rotate by the pawl 40,60 freely in either rotational direction.

Figure 5:
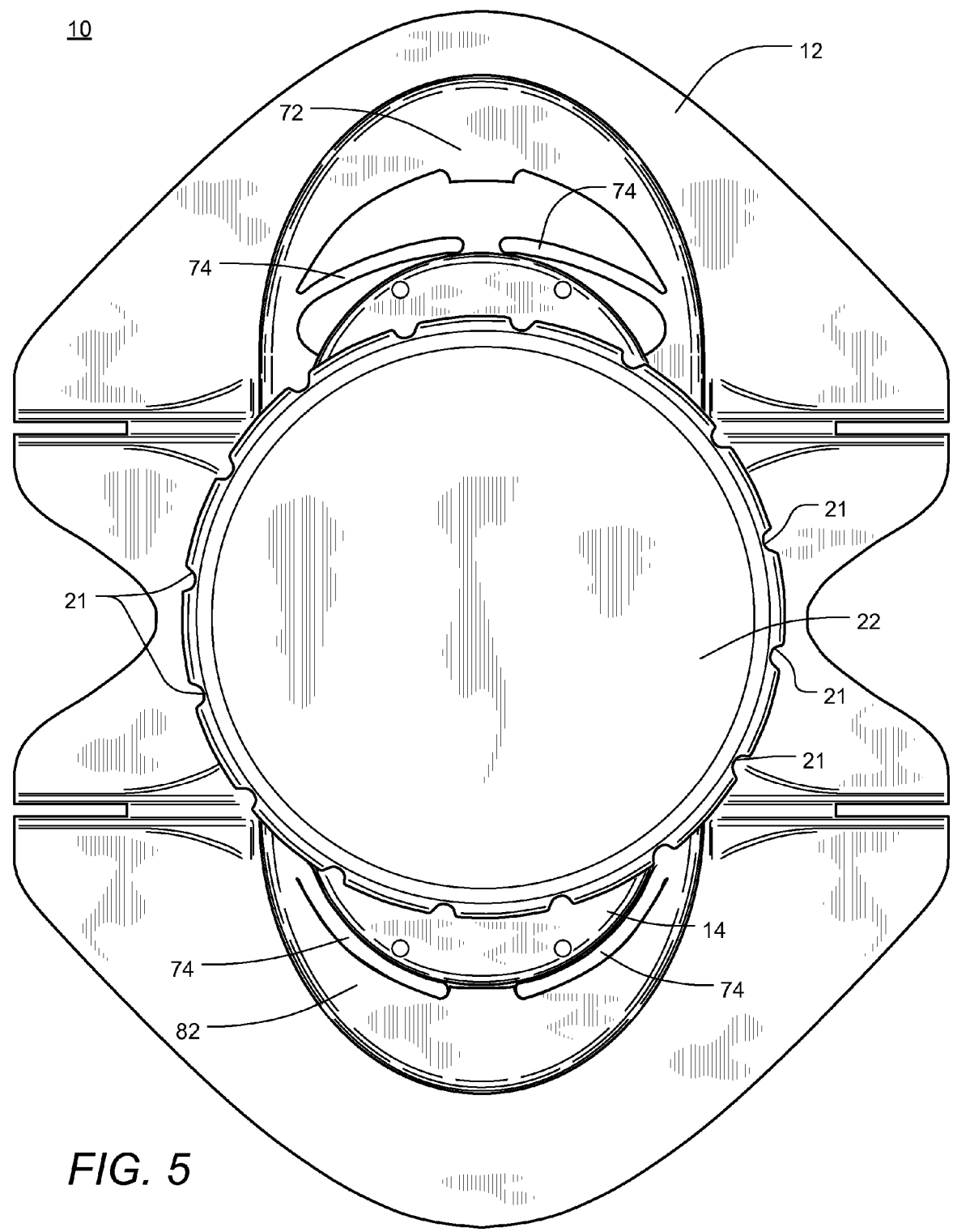
FIG. 5 and 6 are front plan views of the device of FIG. 1 illustrating the alternative movement of the respective release members relative to the rest of the device.
Figure 6:
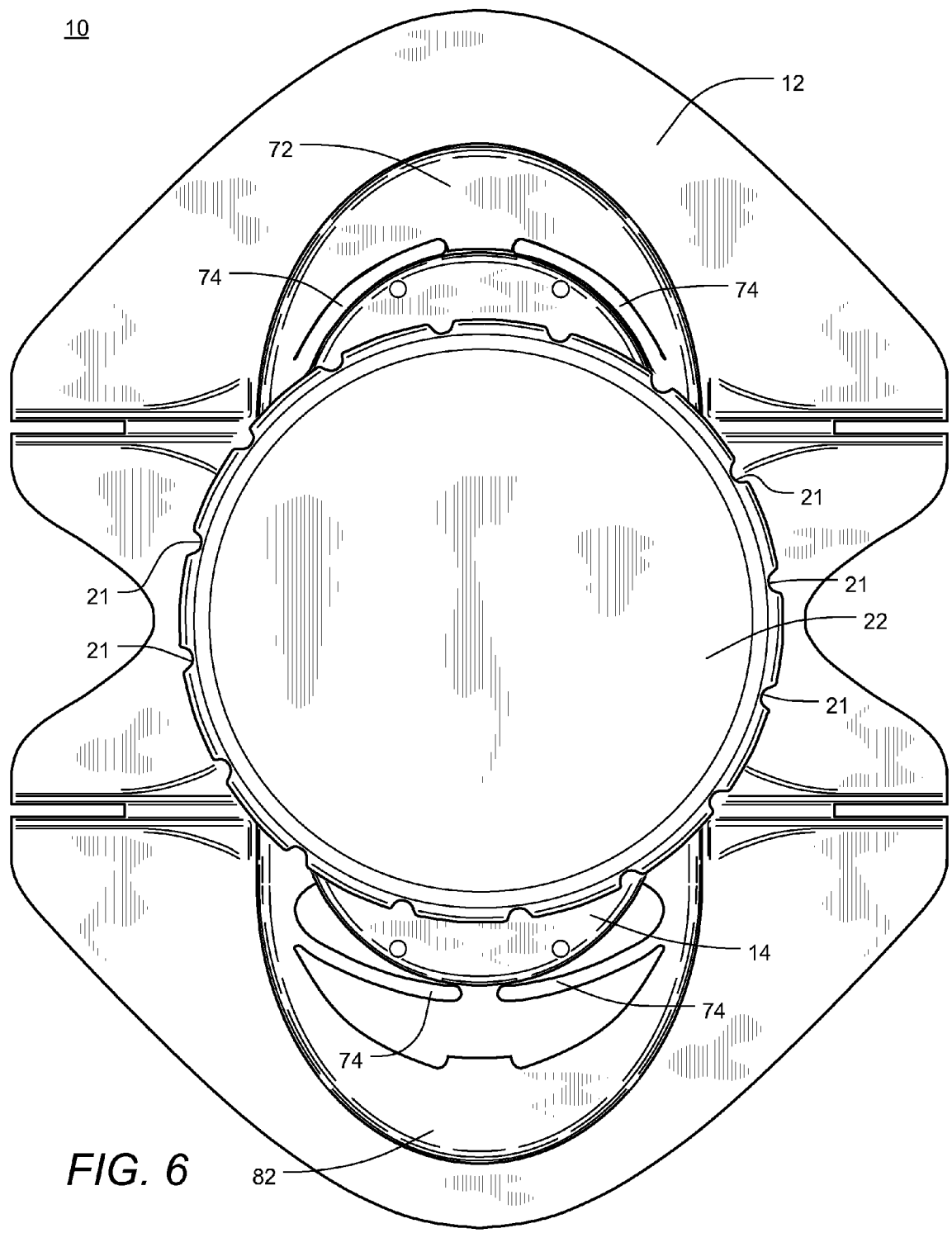
Figure 7A:
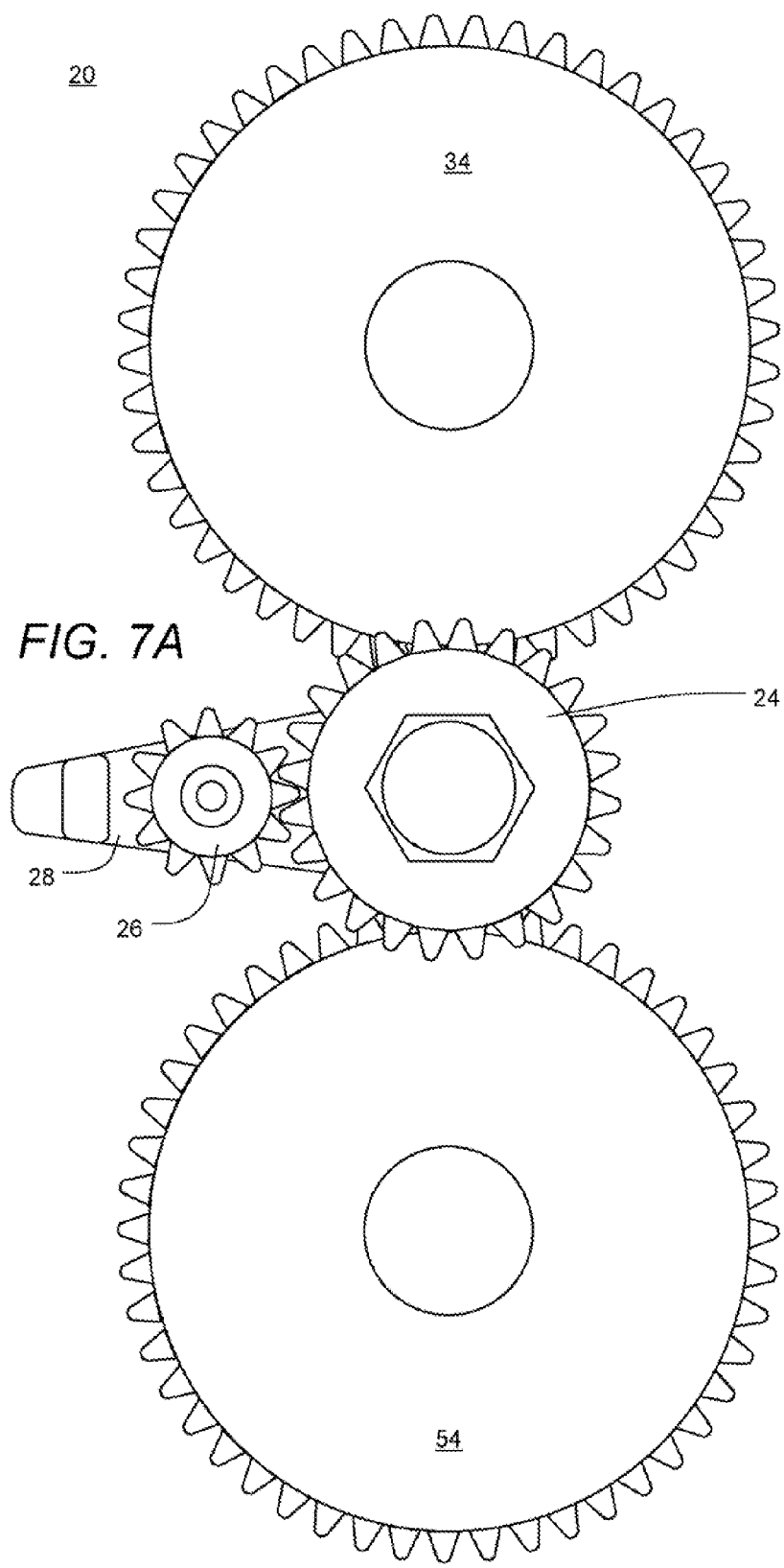
FIG. 7A which is a front plan view of the pivot arm together with the various gears all shown in isolation from the rest of the components of the device, wherein the pivot arm is in a neutral position.
Figure 7B:
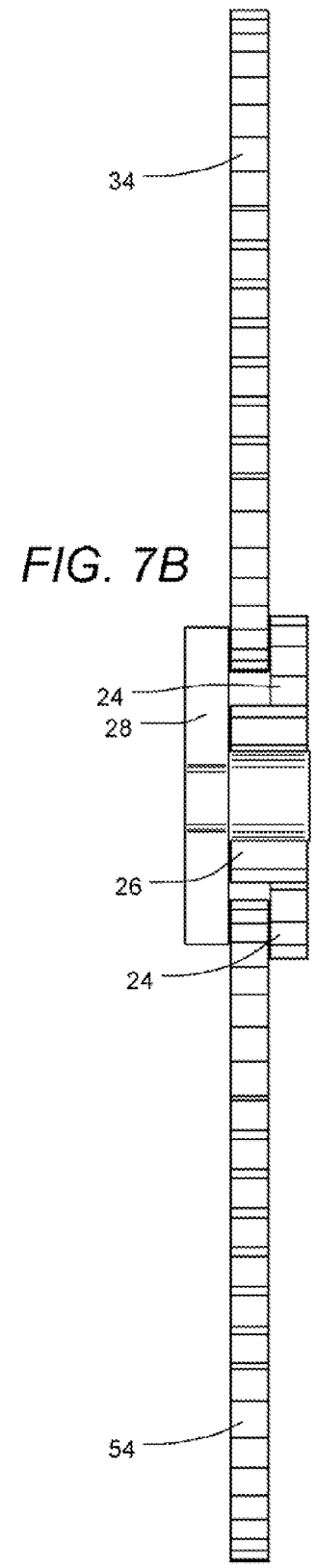
FIG. 7B which is a side plan view of the pivot arm together with the various gears all shown in isolation from the rest of the components of the device, wherein the pivot arm is in a neutral position.

FIGS. 5 and 6 are front plan views of the device 10 of FIG. 1 that serve to illustrate the movement of the respective release members 72, 82 relative to the rest of the device 10, and in particular, relative to the cover 14. As shown, and with reference also to FIG. 1, each release member 72,82 includes an elastic component in the form of a pair of spring arms 74 that extend therefrom and are arranged to receive and engage the rounded end surface of the cover 14. In normal operation, the spring arms 74 tend to bias the respective release members 72,82 out of the housing of the device 10 and away from the ends of the cover 14, thereby keeping (with reference to FIGS. 2 and 4) the open ends of the release members 72,82 from engaging the respective pawls 40,60. However, if it is desired to release one or both pawls 40,60 from the ratchet wheels 36,56, then pressure sufficient to overcome the biasing strength of the spring arms 74 may be applied, thereby causing the selected release member(s) 72,82 to move toward the cover 14 until the spring arms 72 are pressed into the inner curve of the horseshoe-shape of the release member. By this stage, the open end of the selected release member(s) 72,82 preferably have engaged a respective pawl 40,60, and the pawl 40,60 has been forced out of engagement with the teeth of a respective ratchet wheel 36,56, thereby providing for (i.e., permitting by a pawl) the free rotation of the respective spool assembly 30,50 of the ratchet wheel 36,56.

This effect may be seen by comparing and aligning the relative positions of the components in FIG. 4 with those in FIG. 5, as each shows the second release member 82 in its depressed position and the resulting disengagement of the second pawl 60 from the ratchet wheel 56. On the other hand, FIG. 6 illustrates an opposite situation, wherein the first release member 72 is in its depressed position, resulting in the disengagement of the first pawl 40 from the first ratchet wheel 36. Notably, although not specifically illustrated herein, it also will be apparent that both release members 72,82 may be depressed simultaneously, as described previously, thereby releasing both ratchet wheels 36,56 simultaneously.

Referring generally to FIGS. 1 and 2, the base 12 may be seen to include appropriate mounting features to receive the various other components of the device 10. Such mounting features may include contours shaped to receive and retain the components of the device 10 when the cover 14 is securely coupled to the base 12 and retained thereto by the snap-on attachment of the retention flange 25 to the base 12. These features will generally be apparent to those of ordinary skill in the art from the disclosure herein, and are likely to include features for coupling to the cover 14, for receiving the ratchet wheels 36,56 in snug fit, for receiving the drive shaft 23 and pivot arm 28, and the like.

As illustrated, the base 12 may also include features for receiving, guiding and routing lines or cables from the spools 32,52 to the lateral edges of the device 10. These features may take the form of conduits, passageways, cable guides, openings, tube-like structures, and the like, and may be formed in the body of the base 12 or separately attached thereto. The purpose and use of these features will become evident hereinbelow.

Likewise, referring generally to FIG. 1, the cover 14 may be seen or understood to include its own appropriate mounting features to receive the various other components of the device 10. These features will generally be apparent to those of ordinary skill in the art, but are likely to include corresponding features for coupling to the base 12, for receiving the gears 34, 54, for receiving the pinion 26 and the pivot arm 28, and the like.

In order to operate the device 10, a separate line or cable capable of experiencing tension (not shown), which once routed may or may not be in the form of a continuous loop, is first routed through each spool assembly 30,50 and through the guide features in the base 12 as well as any other components as appropriate. Once the cables are installed, each cable may be tightened (placed in greater tension) by turning the dial 22 in one direction or the other. More specifically, turning the dial 22 in one rotational direction causes a first cable (i.e., the one routed through the first spool assembly 30) to be tightened, while turning the dial in the opposite rotational direction causes a second cable (i.e., the one routed through the second spool assembly 50) to be tightened. This is accomplished as follows.

With reference to FIGS. 7A, 7B, 8A, 8B, 9A and 9B, which are all front and side plan views of the pivot arm 28 together with the various gears 24,26,34,54, all shown in isolation from the rest of the components of the device 10. Beginning with FIGS. 7A and 7B, the various components are shown in a neutral state, wherein the pinion 26 is not meshed or engaged with either of the gears 34,54 of the respective spool assemblies 30,50. In this intermediate position, rotation would not be applied to either of the gears 34,54 by the pinion 26 during rotation of the dial 22, drive shaft 23, and drive gear 24. Indeed, rotation of the dial 22, drive shaft 23, and drive gear 24 results in pivoting of the pivot arm 28 upon which the pinion is 26 is carried, and does not result in rotation of the pinion 26 itself about the pinion axis.

As will be appreciated, this is a temporary, transient position only, as rotation of the dial 22 in one rotational direction or the other causes the drive shaft 23 to rotate and in turn tends to cause the pivot arm 28 to rotate and carries the pinion 26 along with it. When the pinion 26 reaches one or the other of the gears 34,54, further rotation of the pivot arm 28 is thereby prevented. At this point, continued rotation of the dial 22 causes the drive gear 24, which is constantly engaged with the pinion 26, to rotate relative to the pinion axis. The pinion 26 then tends to settle into meshed relationship with the first gear 34, thereby causing rotation, in turn, of the gear 34. This relationship is illustrated in FIGS. 8A and 8B.

Conversely, if the dial 22 is rotated in the opposite rotational direction, the drive shaft 23 is caused to correspondingly rotate, in turn tending to cause the pivot arm 28 to rotate and carry the pinion 26 along with it. When the pinion 26 reaches the opposite gear 54, further rotation of the pivot arm 28 is again prevented. At this point, continued rotation of the dial 22 causes the drive gear 24, which is meshed with the pinion 26, to rotate relative to the pinion axis. The pinion 26 then tends to settle into meshed relationship with the gear 54, thereby causing the gear 54 itself to rotate. This relationship is illustrated in FIGS. 9A and 9B.

FIGS. 10-14 are plan views of elements of a device 110 for independently tensioning lines in accordance with a second embodiment of the present invention. The device 110 shares substantial similarity in design and characteristics of operation with regard to those of device 10.

Figure 10:
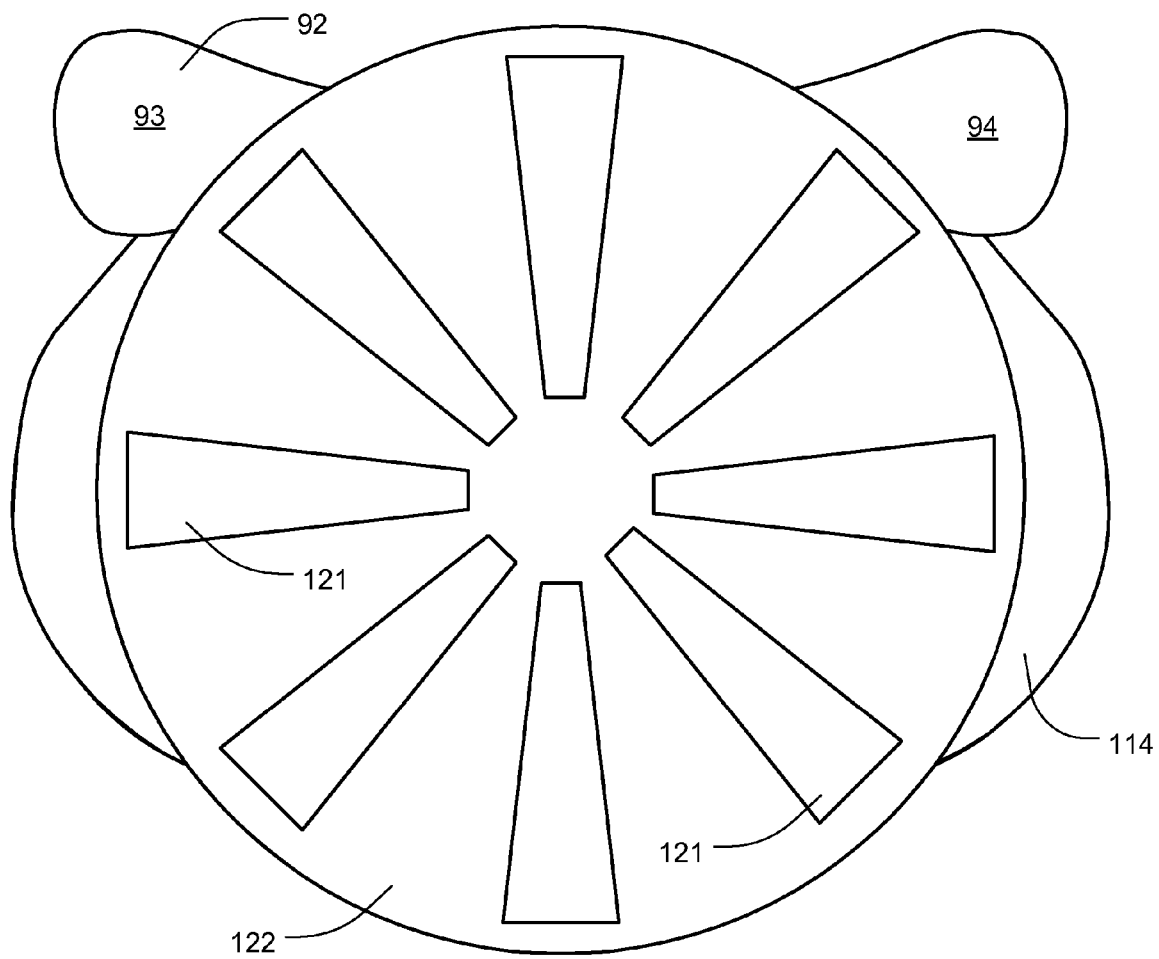
FIG. 10 is a front plan view of a device for independently tensioning lines in accordance with a second embodiment of the present invention.
Figure 11:
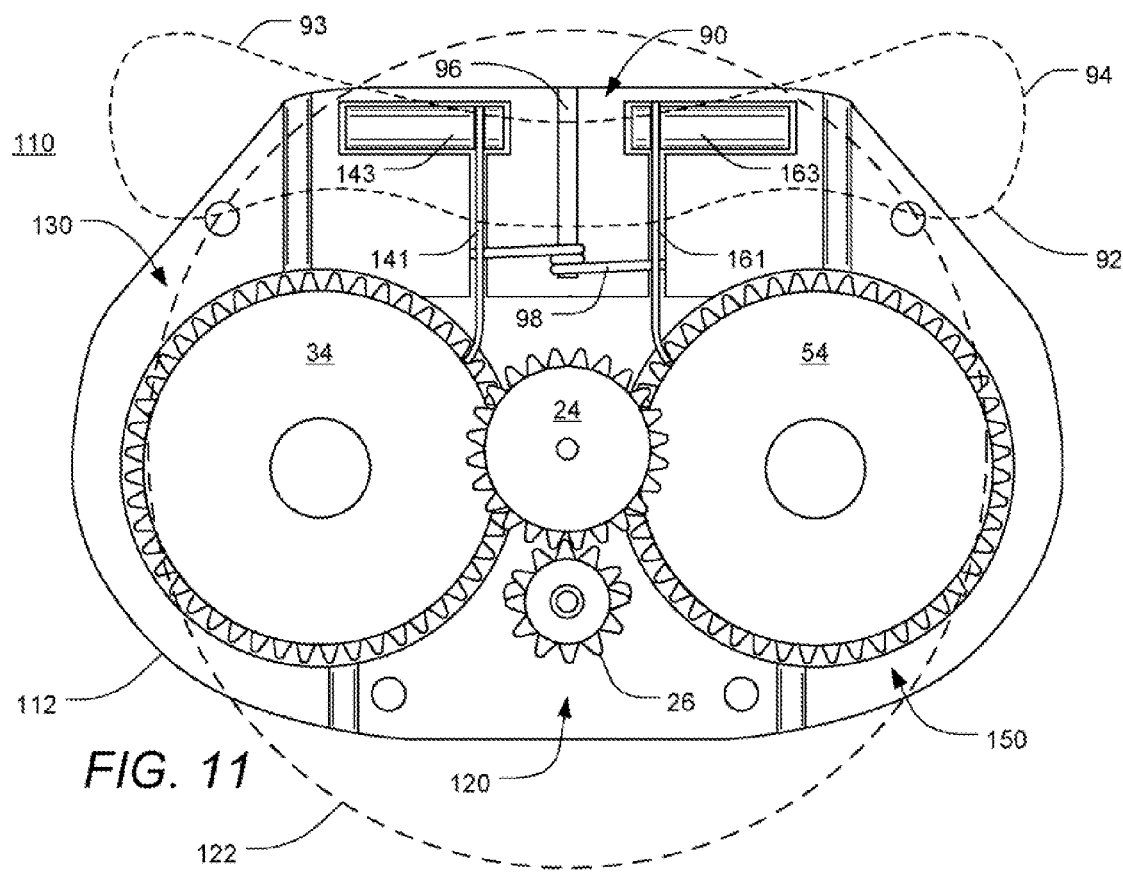
FIG. 11 is a front plan view of the rear half of a device for independently tensioning lines in accordance with a second embodiment of the present invention, wherein a pinion gear is in a neutral position.
Figure 12:
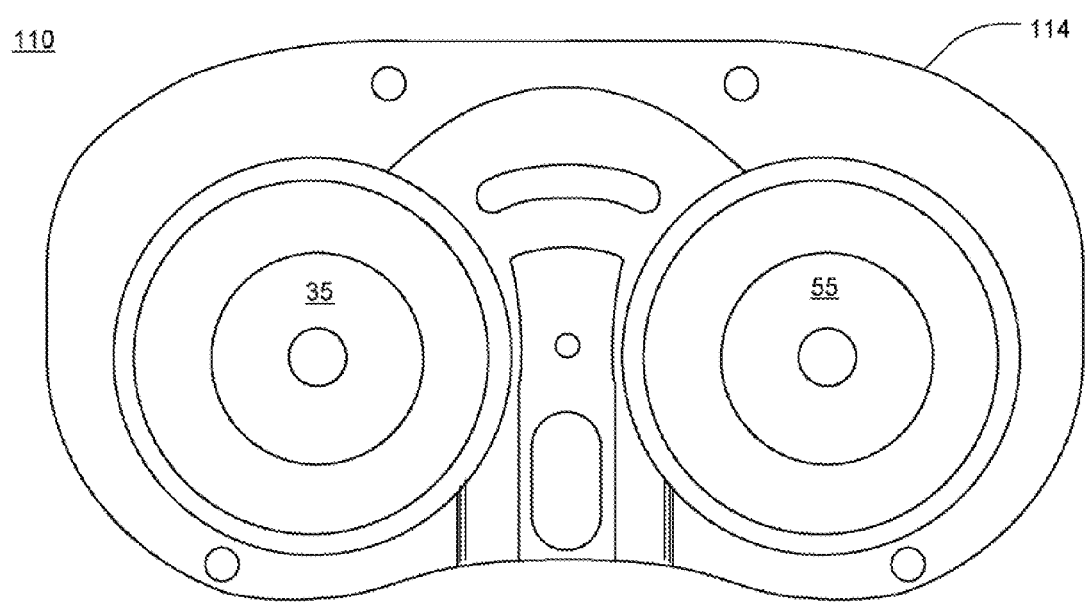
FIG. 12 is a rear plan view of the front half of a device for independently tensioning lines in accordance with the second embodiment of the present invention.
Figure 13:
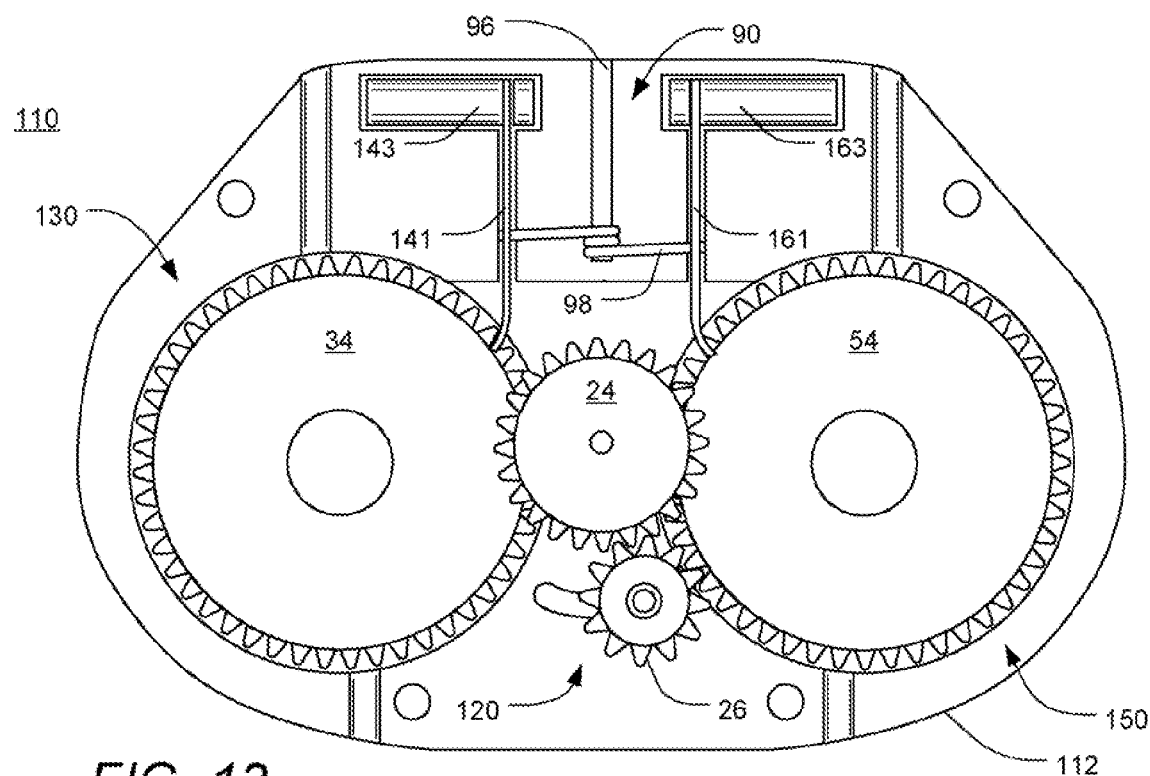
FIG. 13 is a front plan view of the rear half of the device of FIG. 10, wherein the pinion gear is in a first engaged position.
Figure 14:
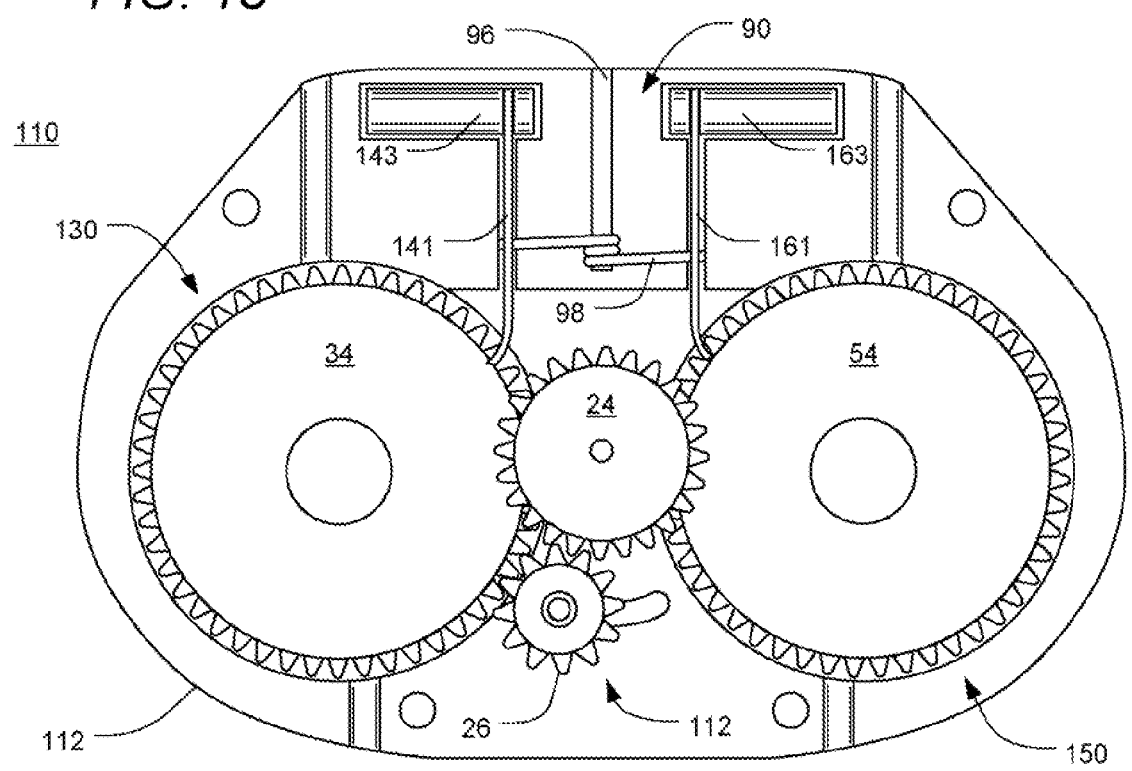
FIG. 14 is a front plan view of the rear of the device of FIG. 10, wherein the pinion gear is in a second engaged position.
Figure 15:
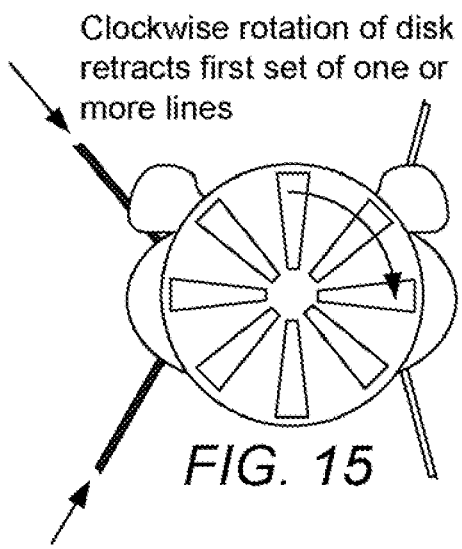
FIGS. 15-19 illustrate a method of using a device in accordance with an embodiment of the present invention for independently tensioning lines merely by clockwise and counter-clockwise rotation of a disk-shaped dial.
Figure 16:
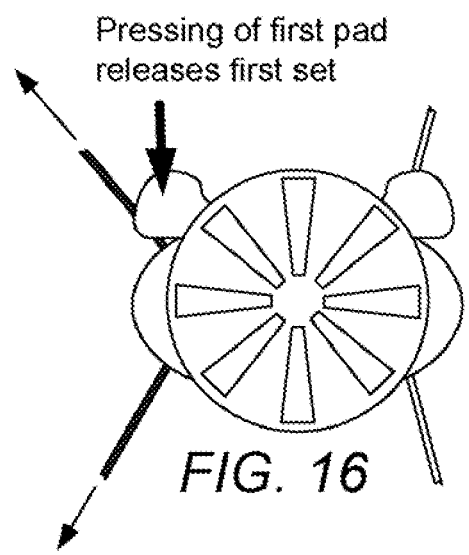
Figure 17:
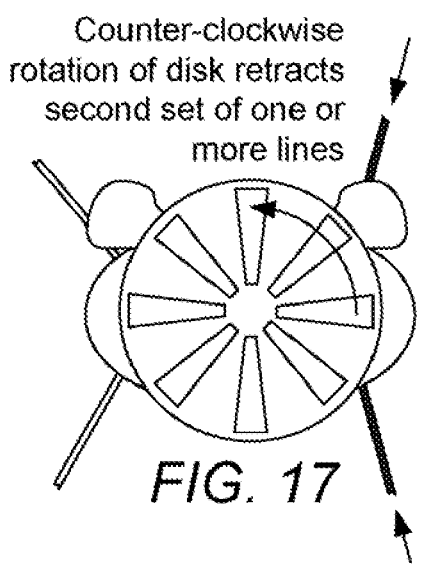
Figure 18:
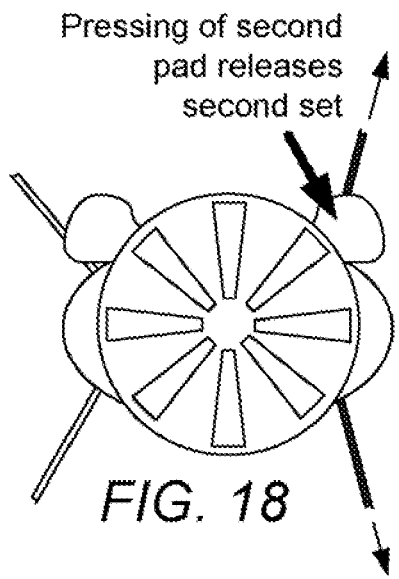
Figure 19:
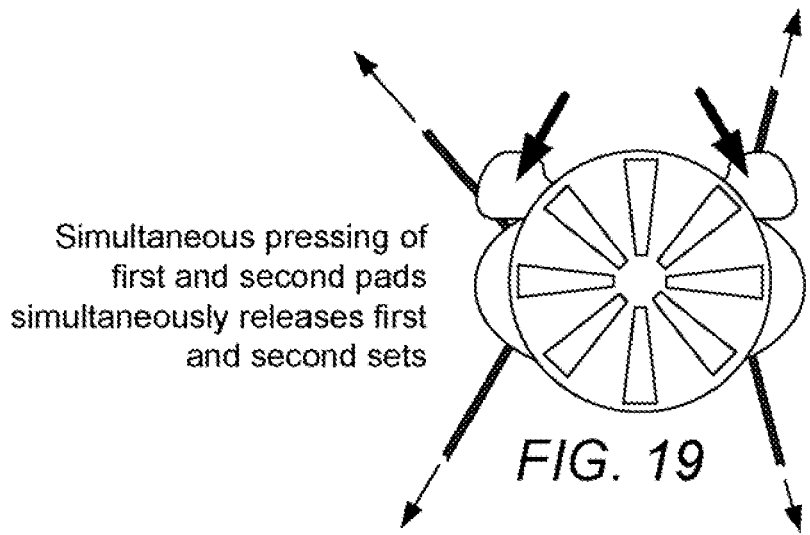

With regard to this second embodiment, FIG. 10 is a front plan view of a device 110 for independently tensioning lines in accordance with a second embodiment of the present invention, while FIG. 11 is a front plan view of the rear half of the device 110 of FIG. 10, and FIG. 12 is a rear plan view of the front half of the device 110 of FIG. 10. As collectively shown therein, the device 110 includes a rear housing 112 and a front housing 114, mounted within which are a drive assembly 120, spool assemblies 30,50, a ratcheting assembly including pawls, and a release assembly 90. Each of these elements is described in detail hereinbelow.

The drive assembly 120 includes a dial 122, a drive gear 124 and a pinion 126. The dial 122 includes a drive shaft (not shown) extending therefrom, and the dial 122 and drive shaft are rotatable about a drive axis. The outer surface of the dial 122 may include indentations or other features 121 to make it possible for a user to grasp and turn it easily. As in the first device 10, the drive gear 124 is fixed on the drive shaft for rotation with the drive shaft about the drive axis. On the other hand, the pinion 126, which is carried on a pivot arm in the device 10, is rotatable around a spindle that is allowed to move along curved slots in the top and bottom casings 114,112 in the device 110. The teeth of the pinion 126 are arranged for a purpose made apparent hereinbelow.

Similar to the first device 110, each spool assembly 130,150 preferably includes a spindle (not shown) upon which a respective spool (not shown) and a respective gear 135,155 are all fixed. The relationship of the spindle, spools, and gears 135,155 is all generally similar in arrangement and function to that of the spindle, spool 32,52, gears 34,54 and ratchet wheel 36,56 of the first device 10, except that in device 110, the gears 135,155 serve the function of gears 34,54 and ratchet wheels 36,56. In this respect, each spool assembly 130,150, is rotatable about a respective spindle axis, with each spool arranged concentric with its respective gear 135,155. Each gear 135,155 includes a plurality of gear teeth adapted to couple with the teeth of the pinion 126 when the pinion 126 is positioned next to a gear 135,155. The teeth of each gear 135,155 also are arranged to be engaged by a respective pawl 141,161. Each spool further includes a pair of openings (not shown), similar to the openings 42 of the first device 10, to permit a cable to be routed there through and then wound on the spool.

Referring generally to FIG. 11, the ratcheting assembly 85 includes a pawl 141,161 for each spool assembly 130,150. Each pawl 141,161 comprises a lever-like structure extending from a respective rotating cylindrical base 143, 163 and having a curved tip at the distal end thereof so as to be adapted to engage the teeth of a respective gear 135,155. When so engaged, each pawl 141,161 inhibits rotation of a gear 135,155 in a respective first rotational direction.

Still referring generally to FIG. 11, the release assembly 90 includes a dual function release lever 92 having a tab or pad 93, 94 at each end thereof. The release lever 92,when selectively depressed, in turn selectively depresses one or both of the pawls thereby freeing, in turn, one or both of the gears 135,155 for rotation uninhibited by a respective pawl.

The pinion 126 is illustrated in a neutral position in FIG. 11, wherein it is disengaged from both of the gears 135,155. The pinion 126 is illustrated in a first engaged position with one of the gears 135,155 in FIG. 13, and the pinion 126 is illustrated in a second engaged position with the other gear in FIG. 14. The pinion 126 is moved into and between these positions by rotation of the drive assembly.

While having some differences in design from that of device 10, the device 110 operates to draw lines into the housing and release lines for withdrawal from the housing in similar manner to device 10. In this regard, operation of the device 110 is illustrated in FIGS. 15-19 and is exemplary of the operation of many different devices in accordance with embodiments of the invention.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A device for independently tensioning lines, comprising:
   (a) a dial including a drive shaft that extends from the dial, the dial and drive shaft rotatable about a drive axis;
   (b) a drive gear fixed on drive shaft for rotation with the drive shaft about the drive axis during rotation of the dial;
   (c) a pinion mounted on a pivot arm and rotatable relative to the pivot arm about a pinion axis, wherein teeth of the pinion are engaged with teeth of the drive gear, and wherein the pivot arm is mounted on the drive shaft and rotatable relative to the drive shaft about the drive axis to different positions including,
      (i) a first position, in which teeth of the pinion engage teeth of a first gear but not teeth of a second gear,
      (ii) a second position, in which teeth of the pinion engage teeth of the second gear but do not engage teeth of the first gear, and
      (iii) an intermediate position, in which teeth of the pinion do not engage teeth of either the first gear or the second gear;
   (d) a first spool fixed on a first spindle for rotation with the first spindle about a first spindle axis, the first spindle being coaxial with, and fixedly connected to, the first gear for rotation therewith about the first spindle axis, the fist spool including a first ratchet wheel coaxial with the first gear;

(e) a second spool fixed on a second spindle for rotation with the second spindle about a second spindle axis, the second spindle being coaxial with, and fixedly connected to, the second gear for rotation therewith about the second spindle axis, the second spool including a second ratchet wheel coaxial with the second gear;

(f) a first pawl configured to engage ratchet teeth of the first ratchet wheel thereby preventing rotation of the first spool in a first rotational direction of the first spool, but permitting rotation of the first spool in a second rotational direction of the first spool;

(g) a second pawl configured to engage ratchet teeth of the second ratchet wheel thereby preventing rotation of the second spool in a first rotational direction of the second spool, but permitting rotation of the second spool in a second rotational direction of the second spool;

(h) a first release member configured to selectively displace the first pawl from engagement with the ratchet teeth of the first spool, thereby permitting rotation of the first spool in the first rotational direction of the first spool; and (i) a second release member configured to selectively displace the second pawl from engagement with the ratchet teeth of the second spool, thereby permitting rotation of the second spool in the first rotational direction of the second spool;

(j) wherein,
(i) rotation of the dial in a first rotational direction about the drive axis results in rotation of the first spool in the second rotational direction of the first spool, but does not result in rotation of the second spool, and
(ii) rotation of the dial in a second rotational direction about the drive axis results in rotation of the second spool in the second rotational direction of the second spool, but does not result in rotation of the first spool.

2. The device of claim 1, further comprising a first line that is wound about the first spool when the first spool is rotated in the second rotational direction of the first spool, whereby tension may be applied to the first line, and a second line that is wound about the second spool when the second spool is rotated in the second rotational direction of the second spool, whereby tension may be applied to the second line independent of tension that is applied to the first line.

3. The device of claim 2, wherein the first spool includes a radial opening through which a first line extends and wherein the second spool includes a radial opening through which a second line extends.

4. The device of claim 2, wherein the first spool includes a pair of opposed radial openings through both of which a first line extends and wherein the second spool includes a pair of opposed radial openings through both of which a second line extends.

5. The device of claim 1, wherein,
(i) the first release member is additionally configured to selectively displace the pivot arm from the first position when the first release member is selectively displacing the first pawl from engagement with the ratchet teeth of the first spool, and
(ii) the second release member is additionally configured to selectively displace the pivot arm from the second position when the second release member is selectively displacing the second pawl from engagement with the ratchet teeth of the second spool.

6. The device of claim 1, wherein,
(a) the first release member is movable between a position in which the first pawl is displaced from engagement with the ratchet teeth of the first spool and a second position in which the first pawl is not displaced from engagement with the ratchet teeth of the first spool, and wherein the first release member is biased by a first elastic component toward the second position; and
(b) the second release member is movable between a position in which the second pawl is displaced from engagement with the ratchet teeth of the second spool and a second position in which the second pawl is not displaced from engagement with the ratchet teeth of the second spool, and wherein the second release member is biased by a second elastic component toward the second position.

7. The device of claim 6, wherein the first elastic component is integrally formed with the first release member, and the second elastic component is integrally formed with the second release member.

8. The device of claim 7, further comprising a housing in which the drive shaft, the drive gear, the pinion, the pivot arm, the first gear, the second gear, the first spool, the first spindle, the first ratchet wheel, the second spool, the second spindle, the second ratchet wheel, the first pawl, and the second pawl are located, wherein the first release member and the second release member extend partially within the housing and partially outside of the housing, and wherein the first and second elastic components engage an exterior of the housing and respectively urge the first and second release members further out of the housing.

9. The device of claim 1, further comprising a housing in which the drive shaft, the drive gear, the pinion, the pivot arm, the first gear, the second gear, the first spool, the first spindle, the first ratchet wheel, the second spool, the second spindle, the second ratchet wheel, the first pawl, and the second pawl are located.

10. The device of claim 9, wherein the housing includes a length and a width that are substantially greater than a height.

11. The device of claim 9, wherein the housing includes a bottom surface that is substantially planar.

12. The device of claim 9, wherein the housing comprises a top casing and a bottom casing that are coupled together.

13. The device of claim 12, wherein the dial is located exterior to the top casing, and wherein the drive shaft extends from the dial through coaxial openings of the top casing and the bottom casing and includes and end thereof that snaps into locking engagement to the bottom casing within the coaxial opening of the bottom casing.

14. The device of claim 12, wherein the first and second pawls are integrally formed with the bottom casing.

15. The device of claim 12, wherein the bottom casing defines cableways providing protected passageways to the first and second spools for the unobstructed tensioning of lines by the first and second spools.

16. The device of claim 12, wherein the bottom casing defines two pair of cableways, each respective cableways of a pair having coaxial passageways.

17. The device of claim 12, wherein the top casing defines a guide slot and wherein the pivot arm includes a extension that is received within the guide slot during movement of the pivot arm between the first, second, and intermediate positions.

18. The device of claim 11, wherein the first spindle and the first gear and integrally formed, and wherein the second spindle and the second gear are integrally formed.

19. The device of claim 11, wherein the dial and the drive shaft are integrally formed.

20. The device of claim 11, wherein the first pool and the first ratchet wheel are integrally formed, and wherein the second spool and the second ratchet wheel are integrally formed.

21. The device of claim 11, wherein the device consists of only injection molded pieces.

22. The device of claim 21, wherein the device does not include any metallic components.

* * * * *

UNITED STATES PATENT AND TRADEMARK OFFICE
CERTIFICATE OF CORRECTION

| | |
|---|---|
| PATENT NO. | : 7,249,727 B2 |
| APPLICATION NO. | : 11/382708 |
| DATED | : July 31, 2007 |
| INVENTOR(S) | : Ian D. Kovacevich et al. |

It is certified that error appears in the above-identified patent and that said Letters Patent is hereby corrected as shown below:

Column 14, line 47, add the word --the-- between the words "on" and "drive" so that line 47 reads as follows:
(b) a drive gear fixed on --the-- drive shaft for rotation with the.

Signed and Sealed this

Eleventh Day of December, 2007

JON W. DUDAS
*Director of the United States Patent and Trademark Office*